United States Patent
Coon et al.

(10) Patent No.: US 6,833,977 B1
(45) Date of Patent: Dec. 21, 2004

(54) LOAD BEAM WITH ENHANCED RESISTANCE TO PLASTIC DEFORMATION IN MANUFACTURING PROCESSES

(75) Inventors: Warren Coon, Temecula, CA (US); Ali Pourdastan, Temecula, CA (US); Amanullah Khan, Temecula, CA (US)

(73) Assignee: Magnecomp Corporation, Temecula, CA (US)

(*) Notice: Subject to any disclaimer, the term of this patent is extended or adjusted under 35 U.S.C. 154(b) by 1059 days.

(21) Appl. No.: 09/034,466

(22) Filed: Mar. 4, 1998

Related U.S. Application Data

(60) Provisional application No. 60/072,129, filed on Jan. 22, 1998.

(51) Int. Cl.[7] ............................. G11B 21/16; G11B 5/48
(52) U.S. Cl. .................. 360/244.2; 360/244.8; 360/244.9
(58) Field of Search ............................. 360/104, 244.2, 360/244.8, 244.9

(56) References Cited

U.S. PATENT DOCUMENTS

| | | | | |
|---|---|---|---|---|
| 5,063,464 A | * | 11/1991 | Astheimer et al. | 360/104 |
| 5,299,081 A | * | 3/1994 | Hatch et al. | 360/104 |
| H1424 H | * | 4/1995 | Budde | 360/104 |
| 5,550,694 A | * | 8/1996 | Hyde | 360/104 |
| 5,625,514 A | * | 4/1997 | Kubo et al. | 360/104 |
| 5,745,319 A | * | 4/1998 | Takekado et al. | 360/104 |
| 5,754,368 A | * | 5/1998 | Shiraishi et al. | 360/104 |
| 5,844,752 A | * | 12/1998 | Bozorgi et al. | 360/104 |
| 5,883,758 A | * | 3/1999 | Bennin et al. | 360/104 |

* cited by examiner

*Primary Examiner*—Craig A. Renner
(74) *Attorney, Agent, or Firm*—Louis J. Bachand

(57) ABSTRACT

A unitary load beam for a disk drive suspension in which the radius of the perimeter transition between the load beam portion and the load beam spring portion is increased to ensure the stress encountered when the load beam is bent from its normal range, for installation into a disk drive, for example, from a previously typical 0.002 inch to 0.010 inch, is distributed sufficiently that the load beam spring portion is subject to only elastic, not plastic deformation. Thus, the gram loads exerted by the load beam spring portion are reliably consistent.

7 Claims, 2 Drawing Sheets

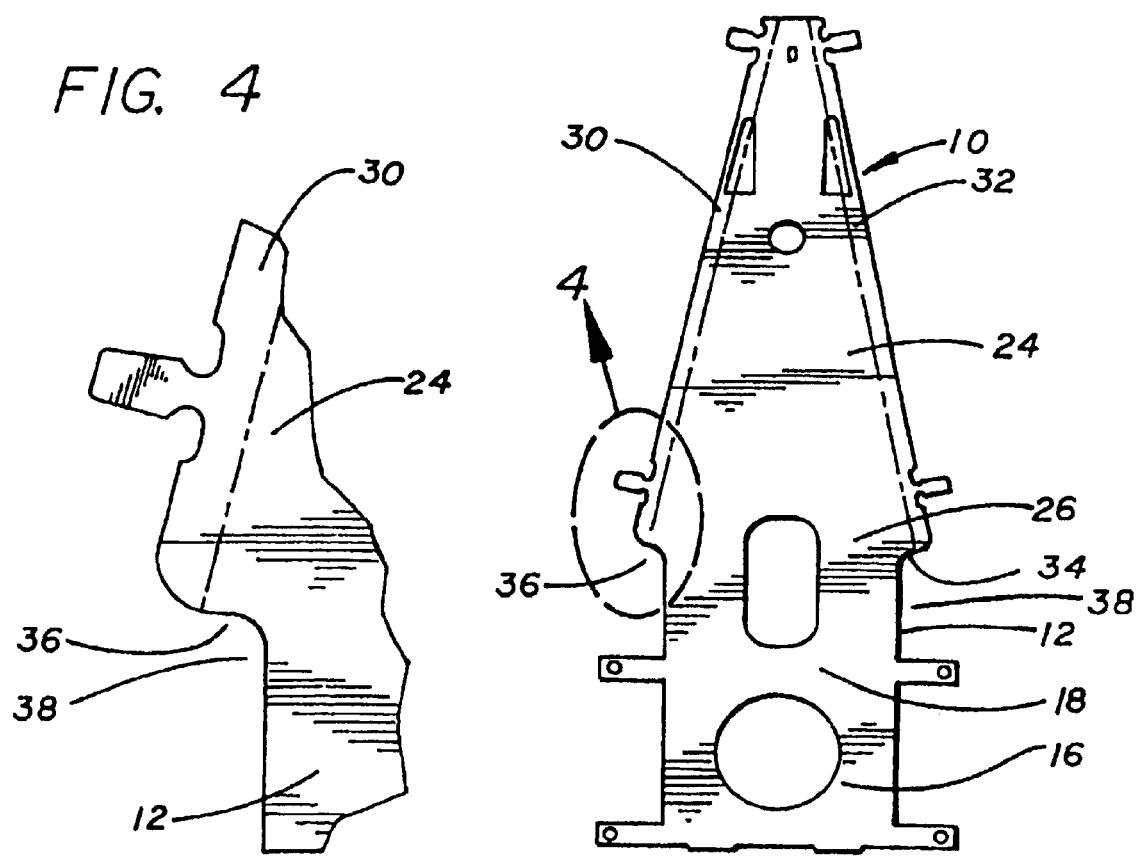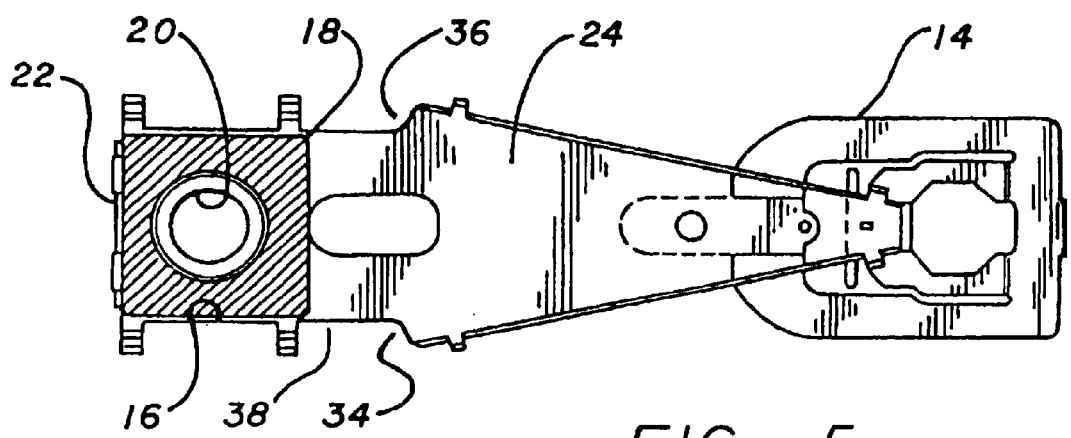

LOAD BEAM WITH ENHANCED RESISTANCE TO PLASTIC DEFORMATION IN MANUFACTURING PROCESSES

REFERENCE TO RELATED APPLICATION

This application claims the benefit of U.S. Provisional Application Ser. No. 60/072,129, filed on Jan. 22, 1998.

BACKGROUND OF THE INVENTION

This invention has to do with disk drive suspensions, and more particularly with improved load beams for such suspensions. In a particular aspect, the invention provides a suspension load beam better adapted to current manufacturing methods in which during suspension installation in a disk drive the load beam spring portion may be deflected or bent back, beyond its normal operating range. The bending back, even if as little as 0.02 inch of deflection past the datum line (a line in the plane of the suspension mounting datum or the load beam mounting on the actuator support for the load beam), will affect the gram force exerted by the load beam, lessening it and unpredictably, if the load beam is bent beyond its limit of elastic deformation, and to the point of being plastically deformed.

SUMMARY OF THE INVENTION

It has been found that plastic deformation occurs when excessive stress occurs at the locus of bending. Accordingly, in the present invention load beam design is improved to enable the load beam to better distribute stresses encountered during installation in a disk drive. It is an object, therefore, of the invention to provide an improved disk drive suspension load beam. In a more particular aspect the invention provides a modified perimeter contour for a load beam in which the radius between the load beam spring portion and the load beam elongated beam portion is increased as much as twice to fivefold or more to enable distribution of stresses encountered in back bending over a greater area and consequent lowering of the peak stress levels to values at which the spring portion is not plastically deformed.

BRIEF SUMMARY OF THE INVENTION

Accordingly, the invention provides a unitary load beam for a disk drive suspension, the load beam having a spring portion providing predetermined gram force properties to the load beam, the spring portion being normally bent beyond its nominal range in the course of its installation into a disk drive with adverse effect on the spring portion and a lessening of the gram force properties exerted thereby, the load beam having a perimeter and comprising a base portion unitary with the proximate end of the spring portion, and an elongated beam portion wider than and unitary with the distal end of the spring portion, the base portion being adapted to provide a mounting surface for mounting the load beam to an actuator, the junctions of the spring portion and the beam portion at the load beam perimeter having a radius distributing the stress of bending the load beam spring portion beyond its nominal range such that the peak value of the stress force is a value less than that at which plastic deformation of the load beam spring portion occurs.

In this and like embodiments, typically: the load beam is fabricated of stainless steel having a yield strength above about 180,000 psi.; the load beam base portion and the load beam spring portion are of about the same width; the load beam portion is tapered inwardly from its proximate end to its distal end, the beam portion being wider than the load beam spring portion at its widest part, and narrower than the spring portion at its narrowest part; and, the radius of the junctions of the beam portion and the spring portion is at least about 0.004 or 0.008 to 0.010 inch or more.

In a particularly preferred embodiment, the invention provides a unitary load beam for a disk drive suspension, the load beam having a spring portion providing predetermined gram force properties to the load beam, the spring portion being normally bent at least 0.08 inch beyond its nominal range in the course of its installation into a disk drive with adverse effect on the spring portion and a lessening of the gram force properties exerted thereby, the load beam having a perimeter and comprising a base portion unitary with the proximate end of the spring portion, and a relatively wider elongated beam portion unitary with the relatively narrower distal end of the spring portion and having left and right edge rails, the junctions of the spring portion and the beam portion at the load beam perimeter having a radius distributing the stress of bending the load beam spring portion beyond its nominal range to a value within which only elastic deformation and not plastic deformation of the load beam spring portion occurs, whereby the gram force properties of the load beam spring portion are at least 96% retained after being bent 0.08 inch beyond its nominal range.

In this and like embodiments, typically: the load beam is fabricated of stainless steel having a yield strength above about 180,000 psi.; the load beam base portion and the proximate end of the load beam spring portion are of like width; the load beam portion is tapered inwardly from its proximate end to its distal end, the beam portion being wider than the load beam spring portion at its widest part, and narrower than the spring portion at its the distal end; the radius of the junctions of the beam portion and the spring portion is at least about 0.008 inch; and, preferably, the radius of the junctions of the beam portion and the spring portion is about 0.010 inch.

BRIEF DESCRIPTION OF THE DRAWINGS

The invention will be further described in conjunction with the attached drawings in which:

FIG. 3 is a plan view of a load beam according to the invention;

FIG. 4 is a view taken on line 4 in FIG. 3; and,

FIG. 5 is a view of the invention load beam assembled with a flexure and mounted at its base portion to an actuator by a mounting plate.

DETAILED DESCRIPTION OF THE INVENTION

Figure 1:
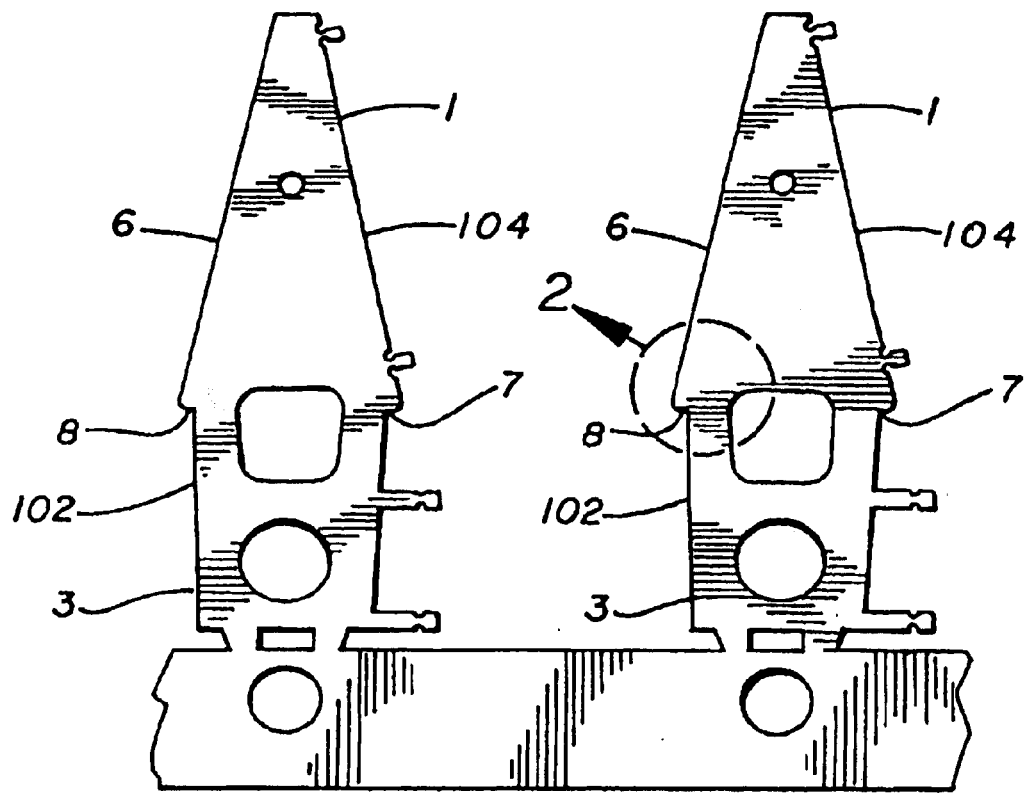
FIG. 1 is a plane view of a set of PRIOR ART load beams after etching and before final forming steps, still attached to a base.

The invention provides a number of advantages in load beam suspensions, including better reproducibility of performance results in the installed condition owing to fewer stress event distortions of the load beam during the process of installation in a disk drive, and improved yields in manufacturing. As noted, during the assembly of a suspension onto a slider to form an HGA (Head Gimbal Assembly), and during the assembly of several HGAs to form an HSA (Head Stack Assembly), the suspension is in one of three states:

1. The free state, wherein there is no external force applied to the suspension, (except for gravity), and the suspension Z-height (distance from the suspension mounting datum) is above the nominal value; also the load beam spring portion applies no load to the slider.

2. The load range state, where the suspension can be held at any Z-height between the free state and the nominal Z-height for that particular suspension design. At these Z-heights, the spring applies a load between 0 and the nominal load value.

3. The backbend state, where the Z-height is below nominal, and may even be negative (below the datum), so that the load applied by the load beam spring portion is from nominal up to the maximum the spring is capable of applying. The backbend region includes the linear portion of the spring load vs. displacement curve, as well as the non-linear portion thereof where plastic deformation is taking place. After plastic deformation in the non-linear range takes place, the spring experiences hysteresis so that the applied load at the nominal Z-height is not the same as it was before the back bend into the nonlinear region was done.

During the assembly and test operations of the load beam assembly, the load beam assembly (with or without slider attached) is often lifted past the nominal load range position into the back bend region. If this is done to such as extent that the gram load applied by the spring (suspension) is changed to a different value than it had before the back bending took place, the performance of the head will change from its previously characterized value. The flying height and electrical parameters may change, probably by increasing flying height and reducing electrical sensitivity. This can have undesirable effects on disk drive performance and may cause a reduced yield at the drive manufacturing level.

The intersection of the spring area or portion of the load beam and the remainder of the load beam is where the stress is concentrated when the load beam is in the normal and back bending ranges. Finite element analysis confirms this. The load beam is commonly made of 300 series stainless steel that is cold worked to achieve a yield strength of 180,000 psi or higher (this is known as being in the "full hard" or "¾ hard" condition.) When the stress on the load beam in a specific area ("local area") exceeds the yield strength, plastic deformation occurs and the material is permanently changed in shape. The result is that the concentration of stress due to the design shape of the load beam often exceeds the yield strength.

The present load beam is designed differently in the spring portion or area to take into consideration the back bend problem. The present invention solves the back problem by reducing peak stress in the spring area where it transitions to the flanged area of the load beam. By reducing the peak stress below the tensile strength level, the spring remains in elastic deformation and does not experience plastic (permanent) change. This spring area redesign is shown in the attached drawings. In the preferred version, a popular standard load beam design, called the T850 is modified by greatly increasing the radius where the spring area transitions to the flanged rails at the sides of the load beam. By increasing the radius, the stress force is spread out over a larger area, thus reducing the peak stress. The vertical stiffness is reduced somewhat as well, because the spring area becomes narrower, and the vertical stiffness is proportional to the width of the spring area. In a preferred version, the width is reduced about 10%(so the theoretical stiffness is also reduced 10%), while the radius where the stress is concentrated is increased, preferably from 0.002 to at least 0.004 to 0.008, and preferably to 0.010 inch, a five fold increase.

Figure 2:
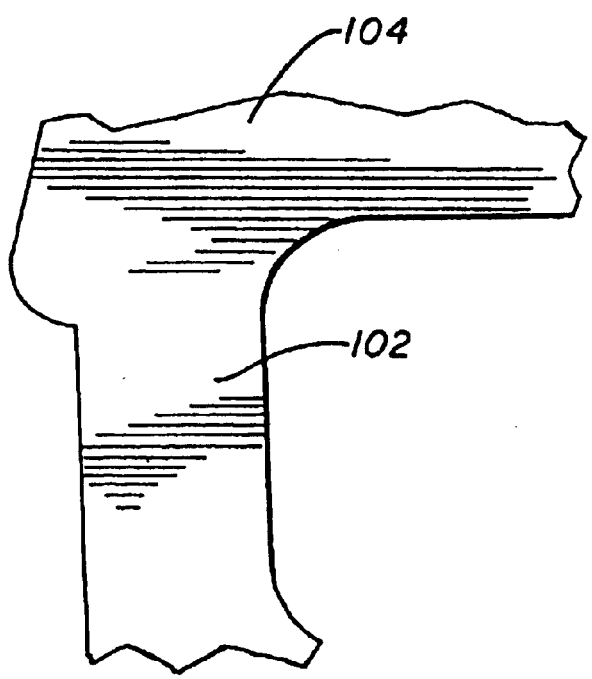
FIG. 2 is a view taken in line 2 in FIG. 1.

With reference now to the drawings in detail, in FIGS. 1 and 2 a prior art T850 suspension load beam is shown at 1 comprising a spring portion 102 providing predetermined gram force properties to said load beam. The load beam 1 has a base portion 3 and an elongated beam portion 104. The load beam 1 has a perimeter 6. The junctions 7, 8 of the load beam spring portion 102 and the beam portion 104 at the load beam perimeter 6 have a small radius of about 0.002 inch. See FIG. 2. This radius does not distribute widely enough the stress of bending the load beam spring portion 102 beyond its nominal range, e.g. bent about 0.08 inch beyond that nominal range, so that the peak stress at junctions 7 and 8 is greater than the elastic deformation limits of the load beam 1 and consequently plastic deformation of the load beam spring portion occurs during installation into a disk drive and design gram force is adversely altered.

With reference now to FIGS. 3, 4 and 5, a load beam according to the invention is shown at 10. Load beam 10 has a spring portion 12 providing predetermined gram force properties in the load beam for positioning flexure 14 to which a slider will be attached at the appropriate distance from a disk during disk drive operation. When installing the load beam 10 into a disk drive the load beam spring portion 12 is frequently bent at least 0.08 inch beyond its nominal range in the course of its installation and there can be expected to be a lessening of the gram force properties exerted thereby. The load beam 10 further comprises a base portion 16 unitary with the proximate end 18 of said spring portion 12. Base portion 16 is affixed to an actuator 20 by a mounting plate 22. Load beam 10 further comprises an elongated beam portion 24, which is relatively wider than the distal end 26 of the load beam spring portion 12, and which has left and right edge rails 30, 32 that serve to stiffen the load beam elongated beam portion 24. It will be noted, especially in contrast to FIG. 2, that junctions 34, 36 between the load beam spring portion 12 and the elongated beam portion 24 at the load beam perimeter 38 are greatly increased in radius, typically at least twice over the FIG. 2 form, to be at least 0.04 inch in radius, or better 0.008 inch in radius and preferably five-fold to be at least 0.010 inch in radius. It has been discovered that the noted increased radius distributes the stress of bending the load beam spring portion 12 beyond its nominal range, e.g. as much as 0.08 inch beyond that range, to keep the stress value within that range in which only elastic deformation and not plastic deformation of the load beam spring portion occurs. The gram force properties of the load beam spring portion 12 are at least 96% retained after being bent 0.08 inch beyond its nominal range where the radius of junctions 34, 36 are kept at about 0.010 inch.

EXAMPLE

A T850 load beam and a load beam having a radius at the junction of the spring portion and the beam portion of 0.010 according to the invention were compared in a series of tests involving bending the load beams back different distances and measuring the change in gram load following the bending. Results are tabulated below. While improvement was noted at different bending levels, including the 0.08 inch level, at the a bend level of 0.01 inch, the T850 load beam gram load loss was about 0.215 to 0.220 gram but the invention design load beam suffered a gram load loss of only about 0.184 gram. Importantly, at a back bend of 0.08 inch the invention load beam retained 97% of its gram load capability, and at 0.010 back bend the invention load beam retained 96% of its gram load capability. The T850 load beam, having a spring rate of 38–40 and assuming a gram force of 4.70, however, lost 0.220 gram or 5% of its force after a 0.10 bend back, or retained just 95% of its gram force. There is accordingly, a 20% decrease in lost gram force under these conditions, a 5% vs. 4% loss for the T850 vs. the invention load beam.

TABLE

|  | Case Number | | | | | | Standard |
|---|---|---|---|---|---|---|---|
|  | 1 | 2 | 3 | 4 | 5 | Average | Deviation |
| LOAD BEAM GRAM LOAD | | | | | | | |
| Nominal | 5.01 | 4.83 | 4.78 | 4.86 | 4.95 | 4.886 | 0.083 |
| 0.02 | 4.96 | 4.77 | 4.75 | 4.82 | 4.89 | 4.838 | 0.078 |
| 0.04 | 4.93 | 4.75 | 4.73 | 4.80 | 4.86 | 4.814 | 0.073 |
| 0.06 | 4.89 | 4.72 | 4.71 | 4.77 | 4.83 | 4.784 | 0.068 |
| 0.08 | 4.85 | 4.68 | 4.68 | 4.73 | 4.78 | 4.744 | 0.065 |
| 0.10 | 4.8 | 4.64 | 4.64 | 4.69 | 4.74 | 4.702 | 0.061 |
| BACK BEND INDUCED GRAM LOSS | | | | | | | |
| 0.02 | 0.05 | 0.06 | 0.03 | 0.04 | 0.06 | 0.048 | 0.013 |
| 0.04 | 0.08 | 0.08 | 0.05 | 0.06 | 0.09 | 0.072 | 0.016 |
| 0.06 | 0.12 | 0.11 | 0.07 | 0.09 | 0.12 | 0.102 | 0.022 |
| 0.08 | 0.16 | 0.15 | 0.10 | 0.13 | 0.17 | 0.142 | 0.028 |
| 0.10 | 0.21 | 0.19 | 0.14 | 0.17 | 0.21 | 0.184 | 0.030 |

The invention accordingly meets the foregoing objects.

We claim:

1. A unitary load beam for a disk drive suspension, said load beam having a spring portion providing predetermined gram force properties to said load beam, said spring portion being normally bent beyond its nominal range in the course of its installation into a disk drive with adverse effect on said spring portion and a lessening of the gram force properties exerted thereby, said load beam having a perimeter and comprising a base portion unitary with the proximate end of said spring portion, and an elongated beam portion extending in a plane and wider than and unitary with the distal end of said spring portion, said beam portion having left and right edge rails, said base portion being adapted to provide a mounting surface for mounting the load beam to an actuator, the left and right junctions of said spring portion and said beam portion at said load beam perimeter having a straight portion normal to said left and right edge rails, respectively, and a radiused portion inward of said straight portion, said straight portion having a lateral extent in the plane of said beam portion that is greater than the lateral extent of said radiused portion in said plane, said radiused portion subtending an oblique angle between said beam portion and said spring portion, whereby the stress of bending said load beam spring portion beyond its nominal range is distributed such that the peak value of the stress force is less than that at which plastic deformation of the load beam spring portion occurs.

2. The unitary load beam according to claim 1, in which said load beam is fabricated of stainless steel having a yield strength above about 180,000 psi.

3. The unitary load beam according to claim 1, in which said load beam beam portion is tapered inwardly from its proximate end to its distal end, said beam portion being wider than said load beam spring portion at its widest part, and narrower than said spring portion at its narrowest part.

4. The unitary load beam according to claim 1, in which the radius of the radiused portion of said functions of said beam portion and said spring portion is at least about 0.004 inch.

5. A unitary load beam for a disk drive suspension, said load beam having a spring portion providing predetermined gram force properties to said load beam, said spring portion being normally bent at least 0.08 inch beyond its nominal range in the course of its installation into a disk drive with adverse effect on said spring portion and a lessening of the gram force properties exerted thereby, said load beam having a perimeter and comprising a base portion unitary with the proximate end of said spring portion, and a relatively wider elongated beam portion extending in a plane and unitary with the relatively narrower distal end of said spring portion and having left and right edge rails, the left and right junctions of said spring portion and said beam portion at said load beam perimeter having a straight portion normal to said left and right edge rails, respectively, and a radiused portion inward of said straight portion, said straight portion having a lateral extent in the plane of said beam portion that is greater than the lateral extent of said radiused portion in said plane, said radiused portion subtending an oblique angle between said beam portion and said spring portion, whereby the stress of bending said load beam spring portion beyond its nominal range is distributed such that only elastic deformation and not plastic deformation of the load beam spring portion occurs, whereby the gram force properties of said load beam spring portion are at least 96% retained after being bent 0.08 inch beyond its nominal range.

6. The unitary load beam according to claim 5, in which said load beam is fabricated of stainless steel having a yield strength above about 180,000 psi.

7. The unitary load beam according to claim 5, in which the radiused portion of each of said junctions of said beam portion and said spring portion is about 0.010 inch.

\* \* \* \* \*